March 30, 1937.  F. V. GALGANO  2,075,391

CHAIN SLIP LINK CONNECTION

Filed May 15, 1936

Frank V. Galgano
INVENTOR.

BY

ATTORNEYS.

Patented Mar. 30, 1937

2,075,391

UNITED STATES PATENT OFFICE 2,075,391

CHAIN SLIP LINK CONNECTION

Frank V. Galgano, Newark, N. J.

Application May 15, 1936, Serial No. 79,900

10 Claims. (Cl. 152—14)

This invention relates to slip link connectors particularly as applied to automobile tire chains for connecting cross chains to the circumferential side chains.

The object of my invention is to permit the rapid removal of worn cross chains and their easy and quick replacement without the necessity of demounting the balance of the chains from the wheel or tire.

A further object is to reduce to a minimum the length of cross chain which must be discarded when the links across the tread of the wheel or tire are no longer fit for use.

A still further object is to enable the average motorist to make his own cross chain replacements at any time without the use of tools.

Another object is to furnish a tie between the cross chains and the side chains that altho easily made remains a positive connection between them under all service conditions.

Other objects will appear in the description which follows.

Heretofore various connectors between cross and side chains have been employed, most of them being permanent in character, that is, attachment and removal not being possible while the chains are mounted and special tools being required for the process. Thus when such cross chains break on the road it is not only impossible to make an immediate repair but it is also impossible to remove the broken parts. The noise of the broken chain striking against the car with every revolution of the wheel is not the only result; scarred finishes, dented and perforated fenders are common sequels. Instances of broken chains engaging with brake drums or other parts of the car and causing the car to swerve suddenly, are well known.

In case of cross chains that have been made detachable without the use of tools it is generally only possible to do so when the chains are not mounted. Then again most of the slip link connectors now in use when scraped against curbing tend to be deformed and thereafter fail to perform their function. Various other reasons have made such detachable cross chains unsatisfactory in service. My invention enables every motorist to make his own cross chain replacements by substituting spare cross chains and this may be done either while the chains are on or off the tire. Breakage may be remedied immediately by removing the broken halves of the cross chain and substituting a new cross chain.

My invention is illustrated in the accompanying drawing in which:—

Figure 3 is a side elevational view of the illustration of Figure 2 showing in dotted line the outline of the tire it would be mounted on.

Referring to the drawing in which similar numbers identify the same or similar parts thruout the several views, the construction is as follows:—

Figure 1:
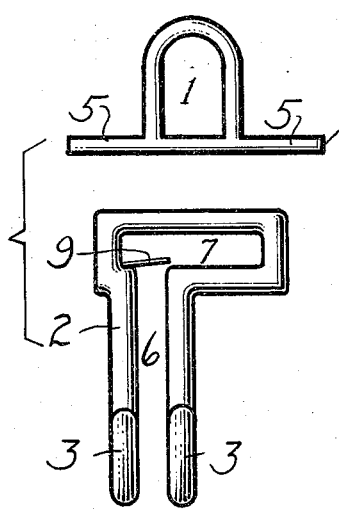
Figure 1 is a front elevational view of the two slip links, unconnected, that when joined form a connection.
Figure 2:
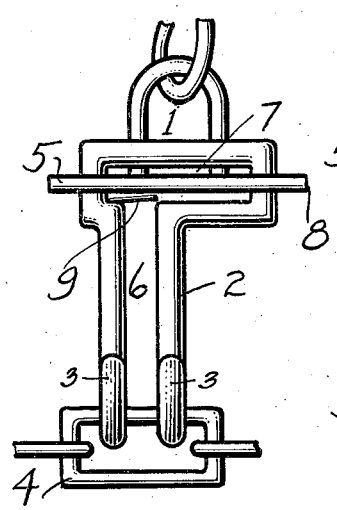
Figure 2 is a front elevational view of the slip links connecting a cross chain with a side chain.

An automobile tire chain is generally composed of two side chains lying in close proximity to the rim of the wheel, and joined across the tread of the tire by a number of cross chains at spaced intervals. It is my purpose to connect each cross chain not directly to a link of the side chain but thru two slip links engaged as shown in Figure 2. These links are, hook link 1 and eye link 2 shown separated in Figure 1.

Figure 3:
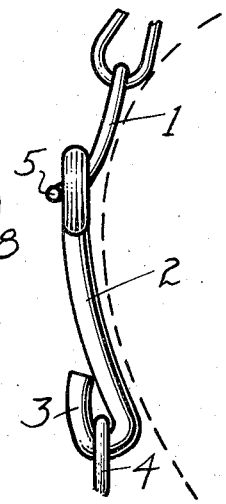

Eye link 2 is permanently affixed to side chain link 4 by hooking or looping its ends 3 around that member as shown. Any means of attachment may be employed as long as it will leave eye link 2 free to rotate about the side arm of link 4. This freedom of movement will enable it to be better manipulated when it is to be joined with hook link 1 and will permit it to more nearly conform to the contour of the tire it lies against. As seen in Figure 3 I prefer to further aid in shaping it to the tire by giving it a curved outline in side elevational view. Since this link is a part of the side chain and will not suffer the abrasive wear to which the cross chain links are subject it will not need to be replaced when the cross chains wear out. I therefore make its length as great as possible without placing it in the path of wear in order to reduce the length of the replaceable cross chain.

Hook link 1 is permanently a part of the cross chain. It is a closed link characterized by a rod or bar piece 5, and has a curved side elevational outline as shown in Figure 3 to better fit to the contour of the tire.

Eye link 2 is shaped to form a vertical slot 6 and a horizontal slot 7, disposed so as to form an unsymmetrical T. Hook link 1 is engaged with eye link 2 by passing 1 edgewise thru slot 6, bar end 8 going thru first. After the body portion of 1 lies vertically in slot 6 it is moved upward into 7 and turned 90° thru the throat portion at the junction of 6 and 7 to lie horizontally in slot 7 as shown in Figure 2. Retainer piece 9, which may be of spring steel closes the top of slot 6 to prevent the accidental disengagement of links 1 and 2,—particularly when the chains are off the tire in a slack condition. The widths of slots 6 and 7 must be sufficient to accommodate the size of the members composing link 1. The length of eye link 2 being determined for the reasons heretofore given generally provides ample length for slot 6. However it might be pointed out that the length of 6 may be much shorter than that of bar piece 5 and the links will still be engageable.

Bar piece 5 is of such length relative to slot 7 and the body portion of 1 that it will not disengage except by passage thru slot 6 similar to the description given.

Figure 4:
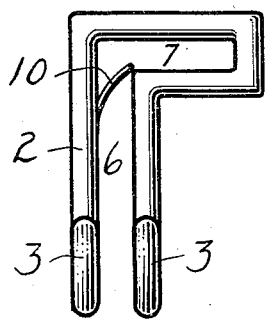
Figure 4 is a front elevational view of the "eye" component of my connector showing a modification.
Figure 5:
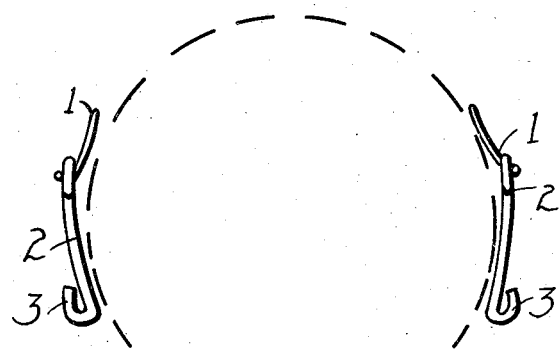
Figure 5 is a side elevational view showing the relative positions of the slip links with respect to an automobile tire, the cross and side chains not being illustrated.

While it is apparent that clearance for the engagement of link 1 with 2 will be had by dispensing altogether with the shorter of the two arms of the T formed by slots 6 and 7 such as I show in Figure 4 it is not so evident what difficulties attend this change. When a vehicle equipped with tire chains moves forward the cross chains do not continue to remain in their same positions. They tend to pull on the side chains, at other than right angles. This twists link 1 within slot 7. By having the longer arm of the T at least equal in length the width of the body part of link 1, and by having the shorter arm as long as the width of one leg of the body part of 1, bearing will be provided for the legs of link 1 upon the main structure of link 2 whenever they are at either end of slot 7. The position of 1 within slot 7 is dependent upon whether the vehicle is going forward or backward, the positions of greatest stress upon the elements of link 2 being when link 1 is against the slot ends. I prefer therefore to provide the general shape of eye link 2 to afford the greatest security against those stresses, and not to unduly stress retainer piece 9. If I do modify eye piece 2 I find it desirable to use a retainer piece 10 shaped as shown, to not only close the top of slot 6 but to be sufficiently sturdy to withstand the stresses, imposed by the twisting action of hook link 1.

It is apparent that many modifications of my invention may be made. The foregoing description is intended to be illustrative only and in no way limiting upon the scope of my invention.

What I claim is:—

1. A slip link connection comprising a slip link having two arms projecting on opposite sides thereof substantially at right angles to its longitudinal axis and a link shaped to form a longitudinal slot opening connecting at one end with a transverse slot opening unsymmetrically disposed with respect to such longitudinal slot opening.

2. A connection for joining a cross chain to a side chain comprising a slip link having two arms projecting on opposite sides thereof substantially at right angles to its longitudinal axis adapted to be slipped into an engagement in, and with, an eye link shaped to form a longitudinal slot opening connected at one end with a transverse slot opening unsymmetrically disposed with respect to such longitudinal slot opening.

3. A connection for joining a cross chain to a side chain comprising a slip link having two external arms lying in the plane of the main portion of the link substantially at right angles to the longitudinal axis thereof, and an eye link having a longitudinal slot opening adapted to pass the arm end of the slip link and a transverse slot opening unsymmetrically disposed with respect to such longitudinal slot opening adapted to receive the slip link from the longitudinal opening and retain the same with its arms substantially parallel to such opening.

4. A connection for joining a cross chain to a side chain comprising a slip link having two external arms lying in the plane of the main portion of the link substantially at right angles to the longitudinal axis thereof, and an eye link having a longitudinal slot opening adapted to pass the arm end of the slip link and a transverse slot opening adapted to accommodate and retain the slip link with its arms parallel to such opening, the longitudinal and transverse slots being separated by a yieldable member.

5. A connection for joining a cross chain to a side chain comprising a slip link attached to the end of the cross chain and an eye link secured to the side chain, the slip link having at its free end a transverse member projecting beyond the sides of the body portion and the eye link forming a longitudinal slot opening dimensioned to pass the free end of the slip link and separated at its one end by a yieldable gate member from a transverse slot opening dimensioned to receive the body portion of the slip link and to prevent the passage of its transverse member.

6. A connection for joining a cross chain to a side chain comprising a slip link attached to the end of the cross chain and an eye link secured to the side chain, the slip link having at its free end a transverse member projecting beyond the sides of the body portion and the eye link forming a longitudinal slot opening dimensioned to pass the free end of the slip link and a transverse slot opening across one end of the longitudinal opening dimensioned to receive the body portion of the slip link and to prevent the passage of its transverse member, a yieldable closure piece between the longitudinal and transverse slots restricting the movement of the slip link to the latter.

7. A connection for joining a cross chain to a side chain comprising a slip link having at one end a transverse member projecting beyond the sides of the body portion, and an eye link having a transverse slot opening wide enough to accommodate the thickness of the slip link and disposed with relation to a connecting longitudinal slot opening so that a portion lying to one side of the junction is at least equal in length to the width of the body portion of the slip link while a portion lying to the other side at least equals in length the thickness of the wire forming the sides of the slip link.

8. A connection for joining a cross chain to a side chain comprising a slip link having at one end a transverse member projecting beyond the sides of the body portion, and an eye link having a transverse slot opening wide enough to accommodate the thickness of the slip link and disposed with relation to a connecting longitudinal slot opening so that a portion lying to one side of the junction is at least equal in length to the width of the body portion of the slip link while a portion lying to the other side at least equals in length the thickness of the wire forming the sides of the slip link; the slip link and eye link being curved on their inside surfaces so that when in engagement the general configuration of the outline of the tire to which they are attached will be followed.

9. A slip link connection comprising a slip link having two arms projecting on opposite sides thereof substantially at right angles to its longitudinal axis and a link formed to outline an unequal armed T shaped opening.

10. A slip link connection comprising a slip link having two arms projecting on opposite sides thereof substantially at right angles to its longitudinal axis and a link formed to outline an L shaped opening.

FRANK V. GALGANO.